United States Patent
Von Niederhausern et al.

(10) Patent No.: US 11,947,989 B2
(45) Date of Patent: Apr. 2, 2024

(54) PROCESS FLOW FOR MODEL-BASED APPLICATIONS

(71) Applicant: SPARKCOGNITION, INC., Austin, TX (US)

(72) Inventors: Eugene Von Niederhausern, Rosenburg, TX (US); Sreenivasa Gorti, Austin, TX (US); Kevin W. Divincenzo, Pflugerville, TX (US); Sridhar Sudarsan, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 127 days.

(21) Appl. No.: 17/176,898

(22) Filed: Feb. 16, 2021

(65) Prior Publication Data

US 2021/0256000 A1    Aug. 19, 2021

Related U.S. Application Data

(60) Provisional application No. 62/976,965, filed on Feb. 14, 2020.

(51) Int. Cl.
| | |
|---|---|
| *G06F 16/903* | (2019.01) |
| *G06F 8/35* | (2018.01) |
| *G06F 8/41* | (2018.01) |
| *G06F 8/52* | (2018.01) |
| *G06F 8/60* | (2018.01) |
| *G06F 9/455* | (2018.01) |
| *G06F 9/50* | (2006.01) |
| *G06F 11/34* | (2006.01) |
| *G06F 16/21* | (2019.01) |

(52) U.S. Cl.
CPC ............ *G06F 9/45558* (2013.01); *G06F 8/35* (2013.01); *G06F 8/433* (2013.01); *G06F 8/52* (2013.01); *G06F 8/60* (2013.01); *G06F 9/5077* (2013.01); *G06F 11/3447* (2013.01); *G06F 16/211* (2019.01); *G06F 16/90335* (2019.01); *G06F 2009/4557* (2013.01)

(58) Field of Classification Search
None
See application file for complete search history.

(56) References Cited

U.S. PATENT DOCUMENTS

| | | | |
|---|---|---|---|
| 2010/0211936 A1* | 8/2010 | Schmitz | B60R 16/0234 717/136 |
| 2011/0173168 A1* | 7/2011 | Jones | G06F 16/88 707/802 |
| 2012/0215860 A1* | 8/2012 | Bohner | G16H 10/60 709/206 |
| 2015/0134362 A1* | 5/2015 | Schneider | G16H 40/20 705/3 |
| 2015/0134594 A1* | 5/2015 | Sethumadhavan | G06F 16/313 707/602 |
| 2018/0150528 A1* | 5/2018 | Shah | G06F 16/254 |
| 2020/0013124 A1* | 1/2020 | Obee | G06Q 40/08 |
| 2021/0141791 A1* | 5/2021 | Nawathe | G06F 16/24575 |

* cited by examiner

*Primary Examiner* — Christopher J Raab (57) ABSTRACT

A process flow for model-based applications, including: receiving data from one or more data sources; applying at least one first transformation on at least a portion of the data to generate transformed input data encoded according to a predefined format; providing the transformed input data to an executed instance of a model facilitating a prediction associated with the data; and exposing access to application data based on an output associated with the model.

20 Claims, 7 Drawing Sheets

PROCESS FLOW FOR MODEL-BASED APPLICATIONS

CROSS-REFERENCE TO RELATED APPLICATIONS

This application is a non-provisional application for patent entitled to a filing date and claiming the benefit of earlier-filed U.S. Provisional Patent Application Ser. No. 62/976,965, filed Feb. 14, 2020.

This application is related to co-pending U.S. patent application Ser. No. 17/176,906, filed Feb. 16, 2021, and co-pending U.S. patent application Ser. No. 17/176,889, filed Feb. 16, 2021, each of which is incorporated by reference in their entirety.

BACKGROUND

Models, such as trained machine learning models, may be used in a variety of data processing and data science applications. Typically, these applications require specifically trained models configured to provide specific outputs based on particularly formatted data. Accordingly, it may be difficult to achieve a streamlined process for processing data from various data sources, and to provide flexibility and customization in which models and applications are used.

DETAILED DESCRIPTION

Models, such as trained machine learning models, may be used in a variety of data processing and data science applications. For example, models may be trained to generate predictions based on input data provided to the model. The output of the model may provide a particular prediction based on the input data. Client- or user-facing applications may then present user interfaces, reports, or other interfaces based on the output of the model. Typically, these applications require specifically trained models configured to provide specific outputs based on particularly formatted data. Accordingly, it may be difficult to achieve a streamlined process for processing data from various data sources, and to provide flexibility and customization in which models and applications are used.

Figure 1:
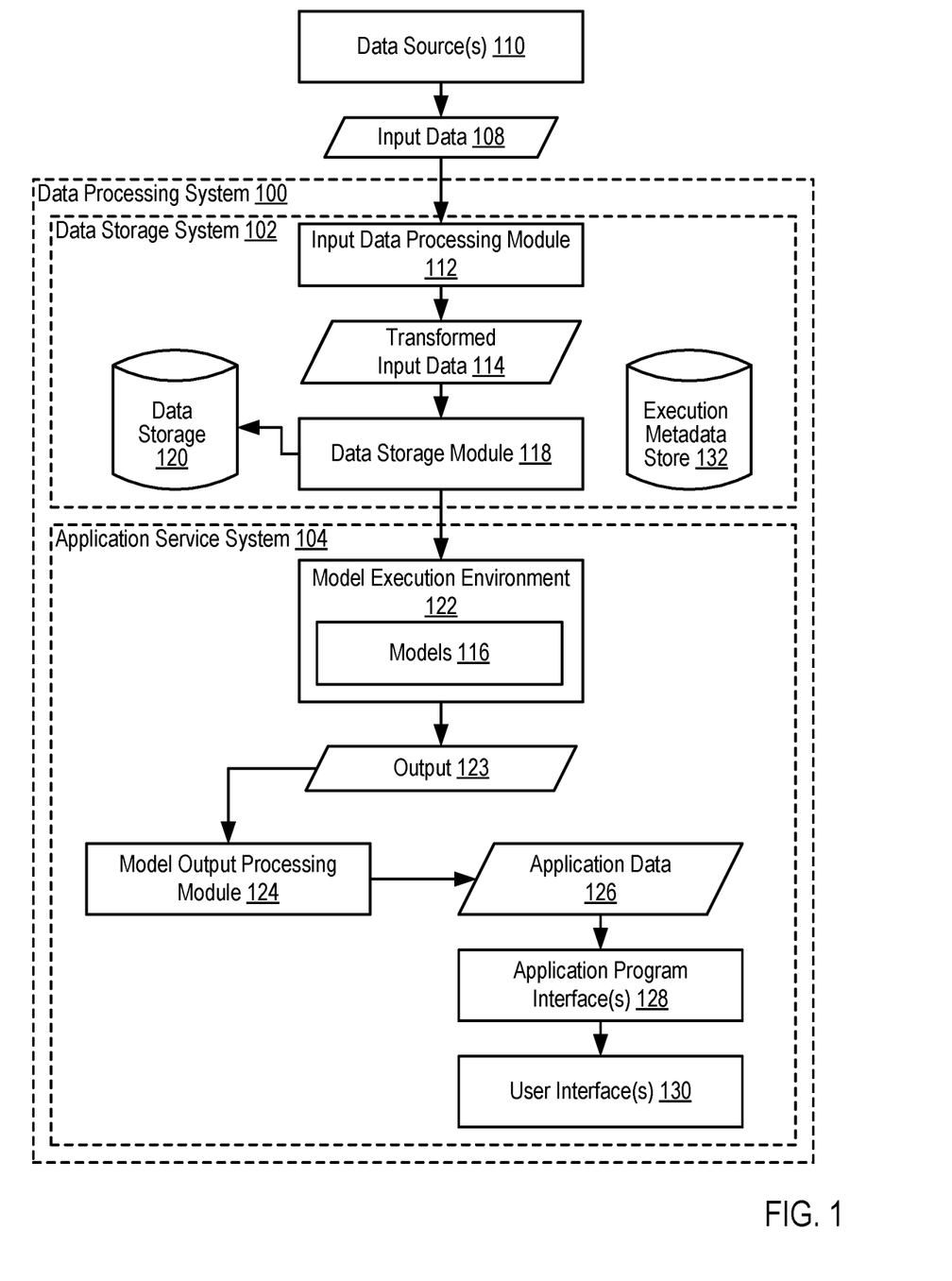
FIG. 1 is a block diagram of an example system for a process flow for model-based applications according to some embodiments.

To address these shortcomings, FIG. 1 is a block diagram of a non-limiting example data processing system 100 for a process flow for model-based applications. The example data processing system 100 includes a data storage system 102 and an application service system 104. Beginning with the data storage system 102, the data storage system 102 receives input data 108 from one or more data sources 110. The data sources 110 may include storage systems (e.g., cloud-based storage systems, remote file repositories, and the like), databases, data streams, or other data sources 110 as can be appreciated. Accordingly, the data storage system 102 may receive the input data 108 by generating and submitting queries to a database, submitting read requests to a storage system, submitting file requests to a web site or file repository, access a data stream, or otherwise receive the input data 108 as can be appreciated.

In some embodiments, the input data 108 includes structured data. The structured data is data encoded according to a particular defined schema or format. For example, structured data may include database results encoded in a particular database schema (e.g., defined rows and columns). As another example, the structured data may be encoded using a particular markup language, such as Hypertext Markup Language (HTML) or Extensible Markup Language (XML). As a further example, the structured data may include data encoded using a particular data structure (e.g., arrays, vectors, and the like). In some embodiments, the input data 108 includes unstructured data, such as alphanumeric strings or text in a document. In some embodiments, the input data 108 includes a combination of structured and unstructured data. For example, a first data source 110 may provide structured data while a second data source 110 provides unstructured data. One skilled in the art will appreciate that a variety of data sources 110 may provide a variety of input data 108 of a variety of types to the data storage system 102 for processing.

The input data 108 is provided by the data storage system 102 to an input data processing module 112. The input data processing module 112 applies one or more transformations to at least a portion of the input data 108 to generate transformed input data 114. The transformed input data 114 is encoded in a particular, predefined format. For example, the transformed input data 114 is encoded in a predefined format (e.g., as structured data) to be provided as input to one or more models 116, as will be described in further detail below. Accordingly, the one or more transformations applied by the input data processing module 112 causes the at least a portion of the input data 108 to be transformed to the predefined format from another format.

As an example, where the input data 108 includes structured data, the input data processing module 112 may apply one or more transformations to the structured data to transform the structured data from a first format to a second format. As another example, where the input data 108 includes unstructured data, the input data processing module 112 may apply one or more transformations to the unstructured data (e.g., tokenization, parsing, vectorization, and the like) to generate structured data. One skilled in the art will appreciate that, in some embodiments, the structured data generated from the unstructured data by the input data processing module 112 may not be in the predefined format of the transformed input data 114. Accordingly, in some embodiments, the input data processing module 112 may need to apply one or more second transformations to the generated structured data in order to generate the transformed input data 114. In some embodiments, the input data 108 received from a given data source 110 may already be encoded in the predefined format of the transformed input data 114. Accordingly, in such embodiments, the input data processing module 112 may omit applying any transformations to the input data 108 and output the input data 108 as transformed input data 114. One skilled in the art will also appreciate that the particular transformations applied by the input data processing module 112 may depend on the particular input data 108 received from a given data source 110, and that different transformations may be applied to different input data 108 received from different data sources 110.

In some embodiments, the transformed input data 114 is then provided to a data storage module 118. The data storage module 118 stores the transformed input data 114 in data storage 120, which may include various storage media including hard disk drives, solid state drives, and the like. Although data storage 120 is shown as part of the data storage system 102 of the data processing system 100, it is understood that the data storage 120 may include remote storage such as cloud-based storage systems, remote data storage or data centers, local on-premises storage, or combinations thereof.

The transformed input data 114 is provided as input to one or more models 116 executed in the application service system 104. The models 116 are executed in a model execution environment 122. The model execution environment 122 may include a variety of computing devices, virtual machines, data centers, and the like configured to facilitate execution of the models 116. In some embodiments, the transformed input data 114 is provided in response to a request (e.g., to some module or service executed in the application service system 104) from a particular application, user, or other entity. For example, in response to the request, a query may be sent to the data storage module 118 to load a particular set of transformed input data 114 from the data storage 120. The loaded transformed input data 114 may then be provided as input to the models 116. As another example, the transformed input data 114 may be provided to the models 116 as generated. For example, assume that transformed input data 114 is generated from a stream of input data 108, thereby resulting in a stream or periodically provided set of transformed input data 114 to the models 116.

The models 116 may include machine learning models (e.g., trained machine learning models), algorithmic or manually configured models, and the like. In some embodiments, the transformed input data 114 is provided to a single model 116 configured to generate an output 123 based on the transformed input data 114. In some embodiments, the transformed input data 114 is provided to one of a plurality of models 116. The plurality of models 116 may be configured such that each model 116 receives input from or provides output to another model 116 such that the plurality of models 116 are interdependent. One of the models 116 may then provide an output 123 based on an execution of the plurality of models 116. The output 123 may include, for example, a prediction based on the transformed input data 114. Such a prediction may include, for example, a classification for a classification problem or a numerical value for a regression problem. The output 123 may also include one or more confidence scores associated with the prediction.

The output 123 is then provided to a model output processing module 124. The model output processing module 124 processes, transforms, or encodes the output 123 into application data 126. The application data 126 is data based on the output 123 that is encoded in a particular format or encoding for use in a particular application. The particular transformations or encoding operations performed by the model output processing module 124 may depend on a particular application that may use or access the application data 126. In other words, the model output processing module 124 may apply different transformations to the same output 123, or to output 123 of the same format, depending on which application or applications will be using the application data 126.

The application data 126 is exposed for access by one or more application program interfaces 128. Each application program interface 128 may be used by or accessible to a particular application. The application program interfaces 128 may be used to generate queries for particular portions of application data 126, perform additional transformations on the application data 126, or otherwise expose the application data 126. For example, various user interfaces 130 may be implemented or stored in the application service system 104. As an example, each user interface 130 may include a web page or other component of a web-based interface. As another example, each user interface 130 may include a portion or module of a dedicated application accessible via the application service system 104. Each user interface 130 may be configured to generate particular application program interface 128 calls to access particular application data 126 and render a visualization, report, or other data based on the returned application data 126.

Turning back to the data storage system 102, the data storage system 102 also includes an execution metadata store 132. During execution of a model 116, the model execution environment 122 may store, in the execution metadata store 132, various metadata related to the model execution. For example, such metadata may include identifiers of particular models 116 being executed, including version or iteration numbers to differentiate between versions of a given model 116. As another example, such metadata may include the input to the executed model 116 (e.g., the transformed input data 114) or identifiers of the input (e.g., identifiers of the input in the data storage 120). As a further example, such metadata may include the generated output 123 as well as intermediary data or values generated by the models 116 used in their particular calculations.

The metadata used in the execution metadata store 132 may facilitate various validation, replay, and auditing operations. As an example, the input and model 116 used to generate a particular output 123 may be loaded using the metadata. The input may then be reinput to the model 116 to determine if the same output 123 is generated (e.g., a replay action). As another example, assume that a model 116 has been updated or retrained over time. The input provided to an earlier version of the model 116 and its generated output 123 may be loaded using the metadata. The loaded input data may then be provided to the updated version of the model 116 and the output 123 of the updated version of the model 116 may then be compared to the older version of the model 116. Additionally, the intermediary values and calculations generated by each model may also be compared in order to evaluate model 116 performance.

Consider an example where an application monitors the safety of a power plant. The application includes or accesses a user interface 130 for displaying the current safety levels of the plant, and provides notifications or alerts if an error or fault is predicted. The error prediction is generated as a prediction from one or more executed models 116. Input data 108 is received from various data sources 110, including sensors distributed throughout the plant, user-submitted reports, as well as the various devices and computers deployed throughout the plant. The input data 108 is processed by the input data processing module 112, and the transformed input data 114 is provided to the executed one or more models 116.

As the models 116 receive a continuous flow of transformed input data 114 as input, the models 116 provides continual, updated predictions of whether a fault will occur somewhere in the plant. This output 123 is provided to the model output processing module 124 to generate the application data 126 usable by the error reporting user interface 130. While executed, the user interface 130 generates application program interface 128 calls to retrieve application data 126 reflecting the most recent predictions generated by the models 116. The user interface 130 then displays reports or alerts (as necessary) indicating the current operational state of the power plant.

In the event that an error occurs and is not predicted, metadata in the execution metadata store 132 may be used to replay the input to the models 116. Moreover, the intermediary data generated by the models 116 may be analyzed to determine what particular values or determinations caused the models 116 to return a false negative prediction. This data may then be used to manually refine the model 116 or select additional training data for the model 116 in order to generate an updated version.

Figure 2:
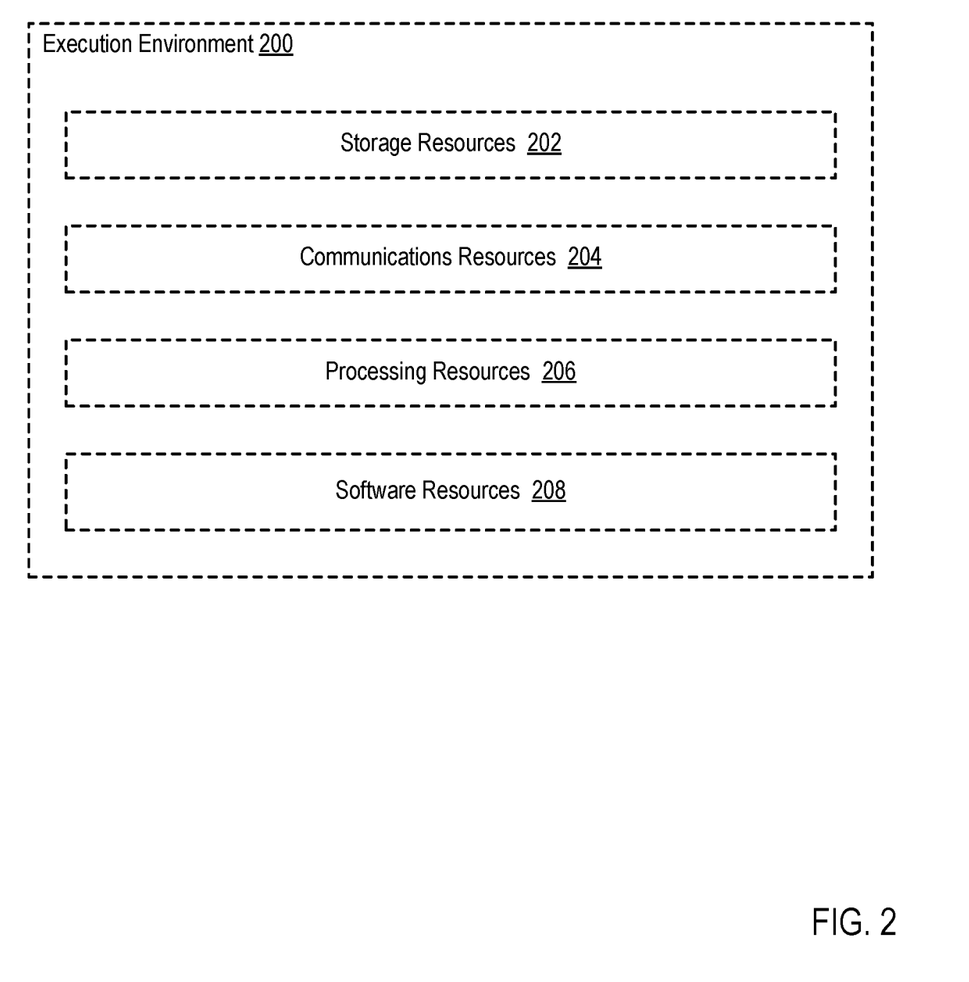
FIG. 2 is a flowchart of an example execution environment for a process flow for model-based applications according to some embodiments.

For further explanation, FIG. 2 sets forth a diagram of an execution environment 200 for a process flow for model-based applications in accordance with some embodiments of the present disclosure. The execution environment 200 may be used to implement various components of the data processing system 100, including the data storage system 102, the application service system 104, and the various subcomponents thereof. The execution environment 200 depicted in FIG. 2 may be embodied in a variety of different ways. The execution environment 200 may be provided, for example, by one or more cloud computing providers such as Amazon Web Services (AWS), Microsoft Azure, Google Cloud, and others, including combinations thereof. Alternatively, the execution environment 200 may be embodied as a collection of devices (e.g., servers, storage devices, networking devices) and software resources that are included in a private data center. In fact, the execution environment 200 may be embodied as a combination of cloud resources and private resources that collectively form a hybrid cloud computing environment.

The execution environment 200 depicted in FIG. 2 may include storage resources 202, which may be embodied in many forms. For example, the storage resources 202 may include flash memory, hard disk drives, nano-RAM, non-volatile memory (NVM), 3D crosspoint non-volatile memory, magnetic random access memory (MRAM), non-volatile phase-change memory (PCM), storage class memory (SCM), or many others, including combinations of the storage technologies described above. Readers will appreciate that other forms of computer memories and storage devices may be utilized as part of the execution environment 200, including DRAM, static random access memory (SRAM), electrically erasable programmable read-only memory (EEPROM), universal memory, and many others. The storage resources 202 may also be embodied, in embodiments where the execution environment 200 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 200 depicted in FIG. 2 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 200 depicted in FIG. 2 also includes communications resources 204 that may be useful in facilitating data communications between components within the execution environment 200, as well as data communications between the execution environment 200 and computing devices that are outside of the execution environment 200. Such communications resources may be embodied, for example, as one or more routers, network switches, communications adapters, and many others, including combinations of such devices. The communications resources 204 may be configured to utilize a variety of different protocols and data communication fabrics to facilitate data communications. For example, the communications resources 204 may utilize Internet Protocol (IP) based technologies, fibre channel (FC) technologies, FC over ethernet (FCoE) technologies, InfiniBand (IB) technologies, NVM Express (NVMe) technologies and NVMe over fabrics (NVMeoF) technologies, and many others. The communications resources 204 may also be embodied, in embodiments where the execution environment 200 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 200, as well as data communications between the execution environment 200 and computing devices that are outside of the execution environment 200.

The execution environment 200 depicted in FIG. 2 also includes processing resources 206 that may be useful in useful in executing computer program instructions and performing other computational tasks within the execution environment 200. The processing resources 206 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 206. The processing resources 206 may also be embodied, in embodiments where the execution environment 200 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 200 depicted in FIG. 2 also includes software resources 208 that, when executed by processing resources 206 within the execution environment 200, may perform various tasks. The software resources 208 may include, for example, one or more modules of computer program instructions that when executed by processing resources 206 within the execution environment 200 are useful for a process flow for model-based applications.

Figure 3:
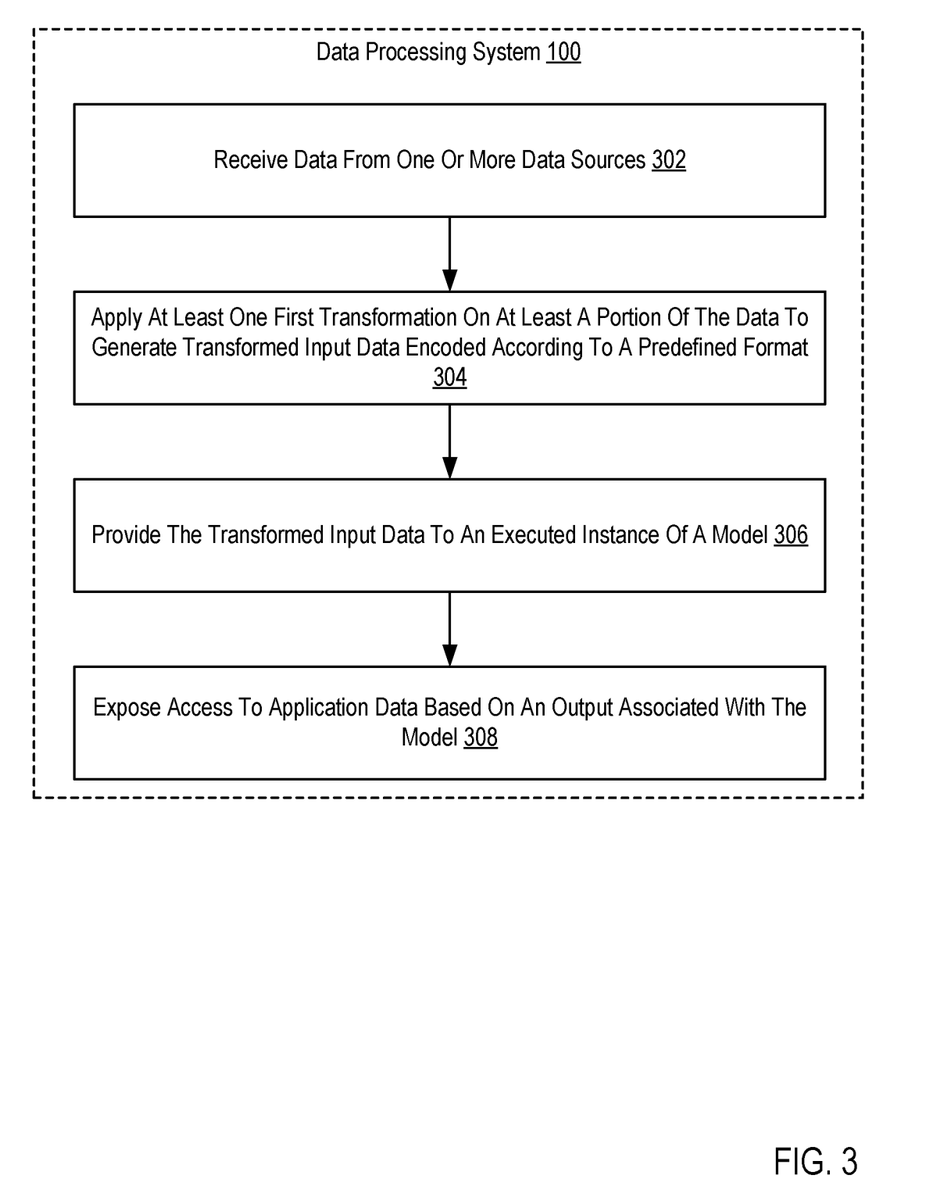
FIG. 3 is a flowchart of an example method for a process flow for model-based applications according to some embodiments.

For further explanation, FIG. 3 sets forth a flow chart illustrating an example method for a process flow for model-based applications that includes receiving 302 (e.g., in a data processing system 100, by a data storage system 102 of the data processing system 100) data (e.g., input data 108) from one or more data sources 110. The data sources 110 may include storage systems (e.g., cloud-based storage systems, remote file repositories, and the like), databases, data streams, or other data sources 110 as can be appreciated. Accordingly, the data storage system 102 may receive the data by generating and submitting queries to a database, submitting read requests to a storage system, submitting file requests to a web site or file repository, access a data stream, or otherwise receive the data as can be appreciated.

In some embodiments, the received data includes structured data. The structured data is data encoded according to a particular defined schema or format. For example, structured data may include database results encoded in a particular database schema (e.g., defined rows and columns). As another example, the structured data may be encoded using a particular markup language, such as Hypertext Markup Language (HTML) or Extensible Markup Language (XML). As a further example, the structured data may include data encoded using a particular data structure (e.g., arrays, vectors, and the like). In some embodiments, the received data includes unstructured data, such as alphanumeric strings or text in a document. In some embodiments, the received data includes a combination of structured and unstructured data. For example, a first data source 110 may provide structured data while a second data source 110 provides unstructured data. One skilled in the art will appreciate that a variety of data sources 110 may provide a variety of data of a variety of types to the data storage system 102 for processing.

The method of FIG. 3 also includes applying 304 (e.g., by the data processing system 100, by an input data processing module 112) at least one transformation on at least a portion of the data to generate transformed input data 114 encoded according to a predefined format. The transformed input data 114 is encoded in a particular, predefined format (e.g., as structured data) to be provided as input to one or more models 116, as will be described in further detail below. Accordingly, the one or more transformations applied by the input data processing module 112 causes the at least a portion of the received data to be transformed to the predefined format from another format. In some embodiments, the data received from a given data source 110 may already be encoded in the predefined format of the transformed input data 114. Accordingly, in such embodiments, the input data processing module 112 may omit applying any transformations to the data and output the data as transformed input data 114. One skilled in the art will also appreciate that the particular transformations applied by the input data processing module 112 may depend on the particular data received from a given data source 110, and that different transformations may be applied to different data received from different data sources 110 depending on their encodings.

The method of FIG. 3 also includes providing 306 (e.g., by the data processing system 100) the transformed input data 114 to an executed instance of a model 116. In some embodiments, the models 116 are executed in a model execution environment 122 (e.g., of an application service system 104 of the data processing system 100). The model execution environment 122 may include a variety of computing devices, virtual machines, data centers, and the like configured to facilitate execution of the models 116. In some embodiments, the transformed input data 114 is provided in response to a request (e.g., to some module or service executed in the application service system 104) from a particular application, user, or other entity. For example, in response to the request, a query may be sent to the data storage module 118 to load a particular set of transformed input data 114 from the data storage 120. The loaded transformed input data 114 may then be provided as input to the models 116. As another example, the transformed input data 114 may be provided to the models 116 as generated. For example, assume that transformed input data 114 is generated from a stream of data, thereby resulting in a stream or periodically provided set of transformed input data 114 to the models 116.

The models 116 may include machine learning models (e.g., trained machine learning models), algorithmic or manually configured models, and the like. In some embodiments, the transformed input data 114 is provided to a single model 116 configured to generate an output 123 based on the transformed input data 114. In some embodiments, the transformed input data 114 is provided to one of a plurality of models 116. The plurality of models 116 may be configured such that each model 116 receives input from or provides output to another model 116 such that the plurality of models 116 are interdependent. One of the models 116 may then provide an output 123 based on an execution of the plurality of models 116. The output 123 may include, for example, a prediction based on the transformed input data 114.

The method of FIG. 3 also includes exposing 308 access to application data 126 based on an output 123 associated with the model 116 (e.g., a prediction output 123 generated by a model 116). The application data 126 may be based on the output 123 of the model 116 in that the application data 126 may be generated by transforming, encoding, formatting, or modifying the output 123 of the model 116. The application data 126 is exposed for access by one or more application program interfaces 128. Each application program interface 128 may be used by or accessible to a particular application. The application program interfaces 128 may be used to generate queries for particular portions of application data 126, perform additional transformations on the application data 126, or otherwise expose the application data 126. For example, various user interfaces 130 may be implemented or stored in the application service system 104. As an example, each user interface 130 may include a web page or other component of a web-based interface. As another example, each user interface 130 may include a portion or module of a dedicated application. Each user interface 130 may be configured to generate particular application program interface 128 calls to access particular application data 126 and render a visualization, report, or other data based on the returned application data 126.

Figure 4:
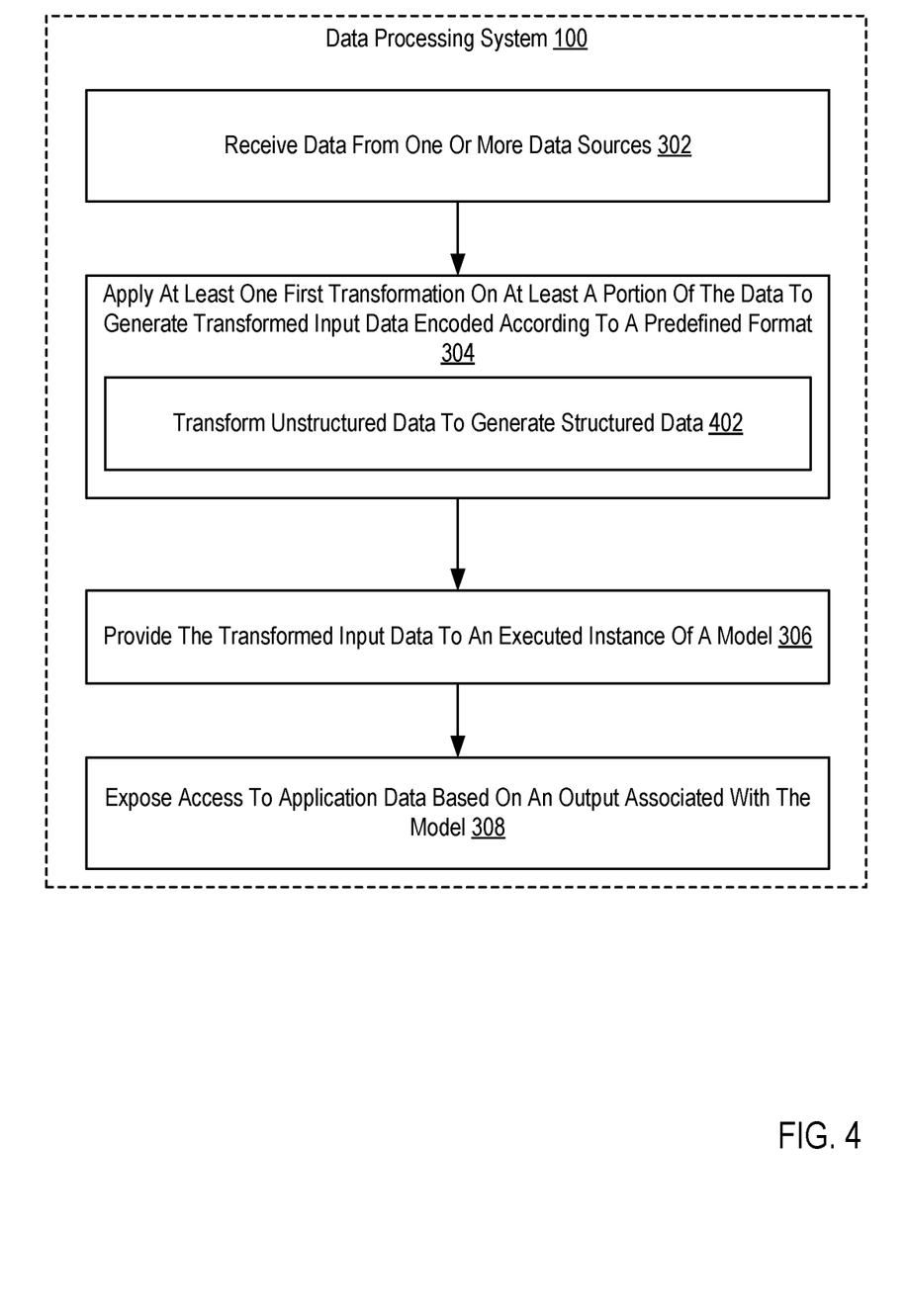
FIG. 4 is a flowchart of another example method for a process flow for model-based applications according to some embodiments.

For further explanation, FIG. 4 sets forth a flow chart illustrating another example method for a process flow for model-based applications according to embodiments of the present disclosure. The method of FIG. 4 is similar to that of FIG. 3 in that the method of FIG. 4 also includes receiving 302 (e.g., in a data processing system 100, by a data storage system 102 of the data processing system 100) data (e.g., input data 108) from one or more data sources 110; applying 304 (e.g., by the data processing system 100, by an input data processing module 112) at least one transformation on at least a portion of the data to generate transformed input data 114 encoded according to a predefined format; providing 306 (e.g., by the data processing system 100) the transformed input data 114 to an executed instance of a model 116; and exposing 308 access to application data 126 based on an output 123 associated with the model 116 (e.g., a prediction output 123 generated by a model 116).

The method of FIG. 4 differs from FIG. 3 in that applying 304 (e.g., by the data processing system 100, by an input data processing module 112) at least one transformation on at least a portion of the data to generate transformed input data 114 encoded according to a predefined format includes transforming 402 unstructured data to generate structured data. Assume that the at least a portion of the data to which the at least one transformation is applied includes unstructured data (e.g., text strings, documents, and the like). The one or more transformations may include transformations to generate structured data from unstructured data, such as parsing, tokenization, vectorization, and the like. One skilled in the art will appreciate that the structured data generated from the unstructured data may not be encoded in the predefined format for the transformed input data 114 until additional transformations are applied. Accordingly, the one or more transformations may include transformations that, when applied transform the first structured data generated from the unstructured data into second structured data encoded in the predefined format.

Figure 5:
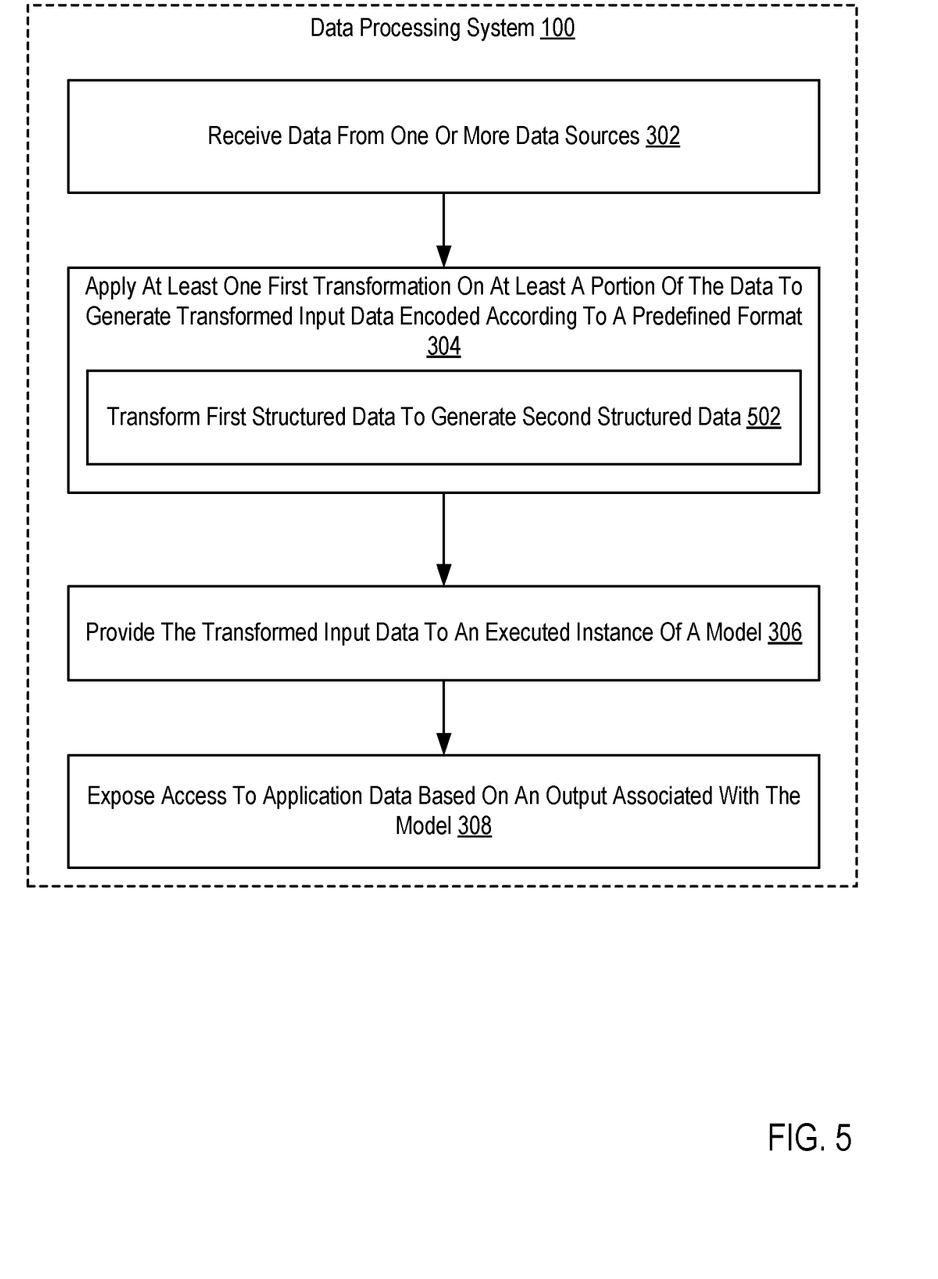
FIG. 5 is a flowchart of another example method for a process flow for model-based applications according to some embodiments.

For further explanation, FIG. 5 sets forth a flow chart illustrating another example method for a process flow for model-based applications according to embodiments of the present disclosure. The method of FIG. 5 is similar to that of FIG. 3 in that the method of FIG. 5 also includes receiving 302 (e.g., in a data processing system 100, by a data storage system 102 of the data processing system 100) data (e.g., input data 108) from one or more data sources 110; applying 304 (e.g., by the data processing system 100, by an input data processing module 112) at least one transformation on at least a portion of the data to generate transformed input data 114 encoded according to a predefined format; providing 306 (e.g., by the data processing system 100) the transformed input data 114 to an executed instance of a model 116; and exposing 308 access to application data 126 based on an output 123 associated with the model 116 (e.g., a prediction output 123 generated by a model 116).

The method of FIG. 5 differs from FIG. 3 in that applying 304 (e.g., by the data processing system 100, by an input data processing module 112) at least one transformation on at least a portion of the data to generate transformed input data 114 encoded according to a predefined format includes transforming 502 first structured data to generate second structured data. Assume that the at least a portion of the data to which the at least one transformation is applied includes first structured data encoded according to a format or schema different than the predefined format for the transformed input data 114. Accordingly, the one or more transformations, when applied to the first structured data, result in second structured data encoded according to the predefined format for the transformed input data 114.

Figure 6:
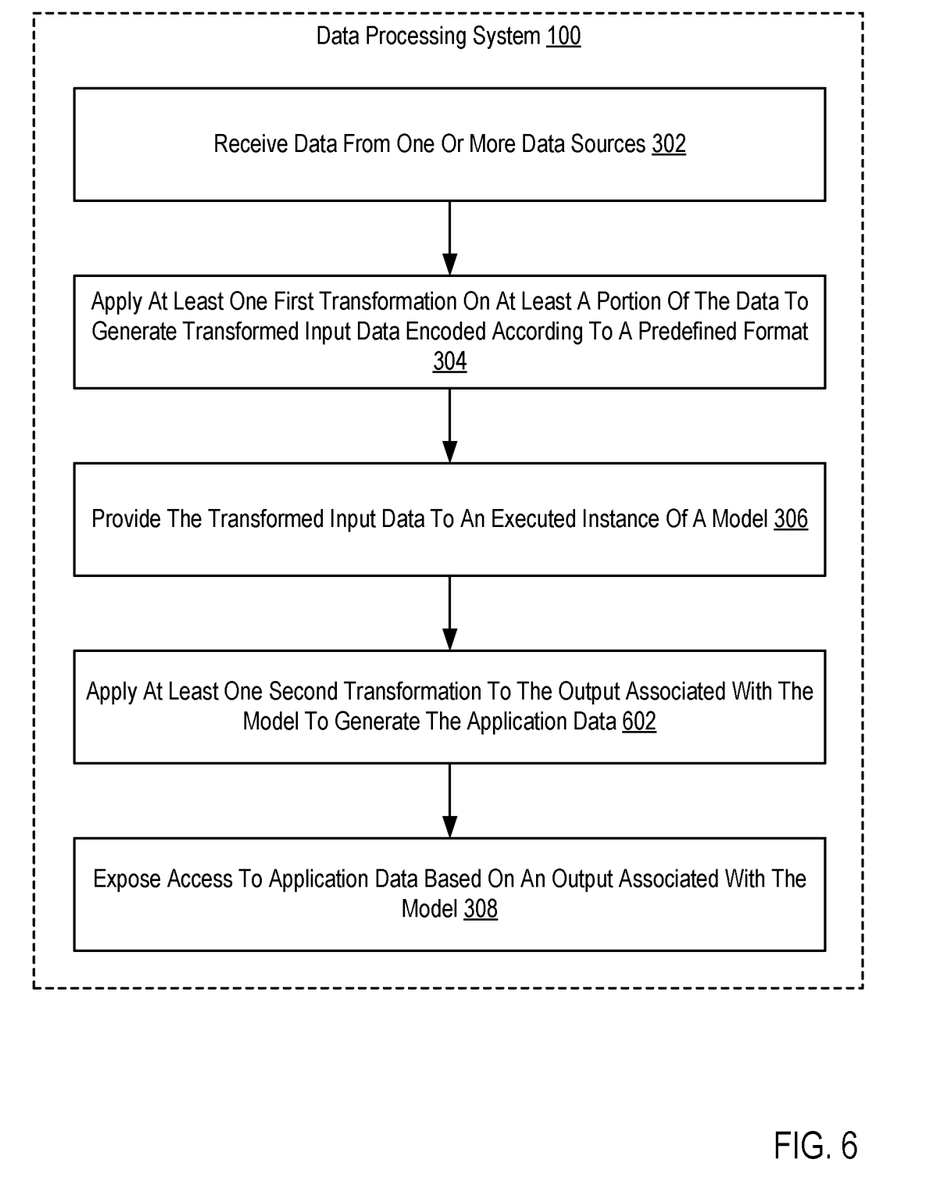
FIG. 6 is a flowchart of another example method for a process flow for model-based applications according to some embodiments.

For further explanation, FIG. 6 sets forth a flow chart illustrating another example method for a process flow for model-based applications according to embodiments of the present disclosure. The method of FIG. 6 is similar to that of FIG. 3 in that the method of FIG. 6 also includes receiving 302 (e.g., in a data processing system 100, by a data storage system 102 of the data processing system 100) data (e.g., input data 108) from one or more data sources 110; applying 304 (e.g., by the data processing system 100, by an input data processing module 112) at least one transformation on at least a portion of the data to generate transformed input data 114 encoded according to a predefined format; providing 306 (e.g., by the data processing system 100) the transformed input data 114 to an executed instance of a model 116; and exposing 308 access to application data 126 based on an output 123 associated with the model 116 (e.g., a prediction output 123 generated by a model 116).

The method of FIG. 6 differs from FIG. 3 in that the method of FIG. 6 also includes applying 602 (e.g., by the data processing system 100, by a model output processing module 124 of an application service system 104) at least one second transformation to the output 123 associated with the model 116 to generate the application data 126. The model output processing module 124 processes, transforms, or encodes the output 123 into application data 126. The application data 126 is data based on the output 123 that is encoded in a particular format or encoding for use in a particular application. The particular transformations or encoding operations performed by the model output processing module 124 may depend on a particular application that may use or access the application data 126. In other words, the model output processing module 124 may apply different transformations to the same output 123, or to output 123 of the same format, depending on which application or applications will be using the application data 126.

Figure 7:
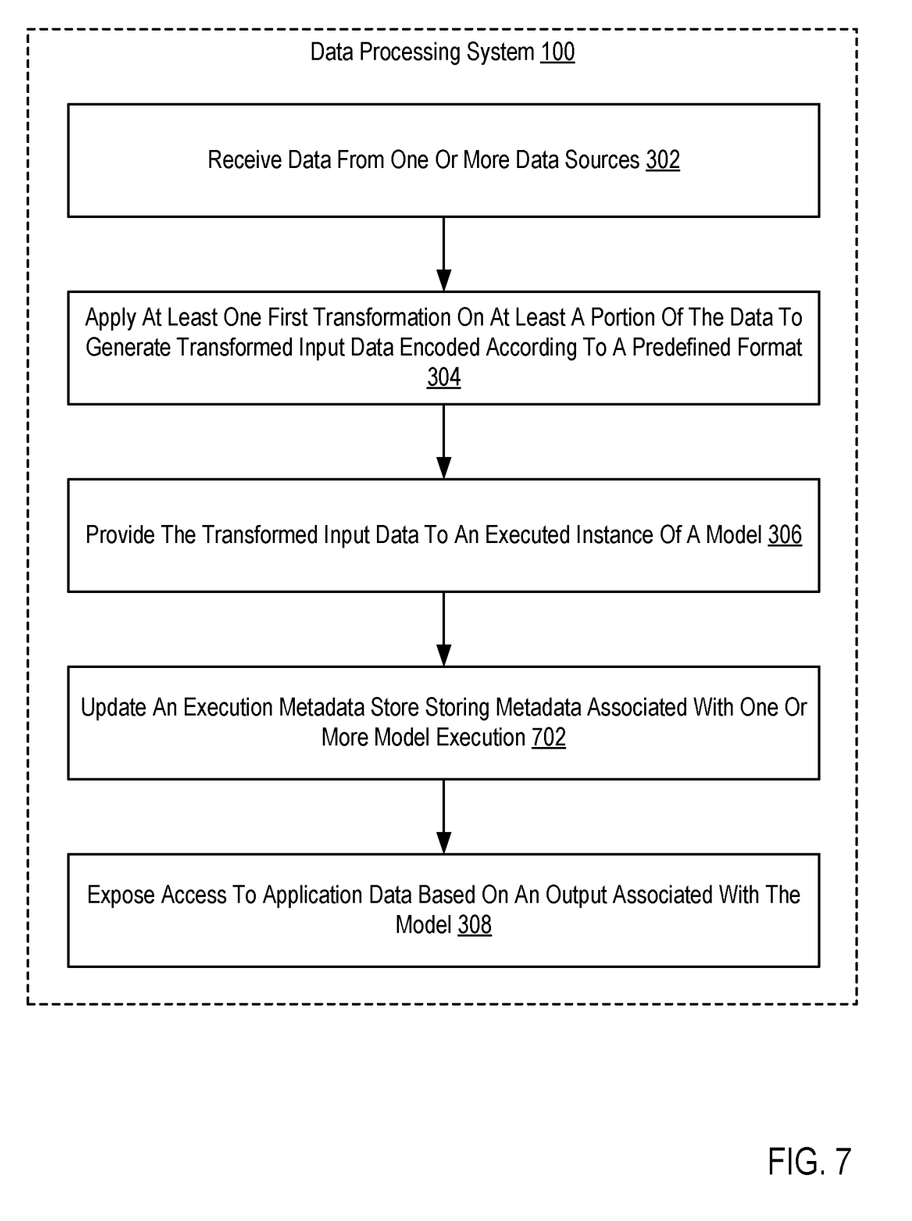
FIG. 7 is a flowchart of another example method for a process flow for model-based applications according to some embodiments.

For further explanation, FIG. 7 sets forth a flow chart illustrating another example method for a process flow for model-based applications according to embodiments of the present disclosure. The method of FIG. 7 is similar to that of FIG. 3 in that the method of FIG. 7 also includes receiving 302 (e.g., in a data processing system 100, by a data storage system 102 of the data processing system 100) data (e.g., input data 108) from one or more data sources 110; applying 304 (e.g., by the data processing system 100, by an input data processing module 112) at least one transformation on at least a portion of the data to generate transformed input data 114 encoded according to a predefined format; providing 306 (e.g., by the data processing system 100) the transformed input data 114 to an executed instance of a model 116; and exposing 308 access to application data 126 based on an output 123 associated with the model 116 (e.g., a prediction output 123 generated by a model 116).

The method of FIG. 7 differs from FIG. 3 in that the method of FIG. 7 also includes updating 702 (e.g., by the data processing system 100) an execution metadata store 132 storing metadata associated with one or more model 116 executions. During execution of a model 116, the model execution environment 122 may store, in the execution metadata store 132, various metadata related to the model execution. For example, such metadata may include identifiers of particular models 116 being executed, including version or iteration numbers to differentiate between versions of a given model 116. As another example, such metadata may include the input to the executed model 116 (e.g., the transformed input data 114) or identifiers of the input (e.g., identifiers of the input in the data storage 120). As a further example, such metadata may include the generated output 123 as well as intermediary data or values generated by the models 116 used in their particular calculations.

The metadata used in the execution metadata store 132 may facilitate various validation, replay, and auditing operations. As an example, the input and model 116 used to generate a particular output 123 may be loaded using the metadata. The input may then be reinput to the model 116 to determine if the same output 123 is generated (e.g., a replay action). As another example, assume that a model 116 has been updated or retrained over time. The input provided to an earlier version of the model 116 and its generated output 123 may be loaded using the metadata. The loaded input data may then be provided to the updated version of the model 116 and the output 123 of the updated version of the model 116 may then be compared to the older version of the model 116. Additionally, the intermediary values and calculations generated by each model may also be compared in order to evaluate model 116 performance.

In view of the explanations set forth above, readers will recognize that the benefits of a process flow for model-based applications include:

- Improved performance of a computing system by providing a flexible and customizable approach for exposing data related machine learning model outputs to various applications and user interfaces.
- Improved performance of a computing system by allowing for the processing of input data from various sources to be used as input to a machine learning model.
- Improved performance of a computing system by allowing for replay, auditing, and analysis of machine learning model performance through the use of an execution metadata store.

Exemplary embodiments of the present disclosure are described largely in the context of a fully functional computer system for a process flow for model-based applications. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method for a process flow for model-based applications, comprising:
receiving data from one or more data sources;
applying at least one first transformation on at least a portion of the data to generate transformed input data encoded according to a predefined format;
providing the transformed input data to an executed instance of a model facilitating a prediction associated with the data;
applying at least one second transformation to the output associated with the model to generate a plurality of versions of application data, wherein each version of the application data is encoded in a different format corresponding to a different application;
exposing access to the plurality of versions of the application data based on an output associated with the model; and
updating an execution metadata store storing metadata facilitating replay of one or more model executions, wherein the metadata is stored separate from data described by the metadata.

2. The method of claim 1, wherein the one or more data sources comprise a data store or a streaming data source.

3. The method of claim 1, wherein the data comprises structured data and unstructured data.

4. The method of claim 1, wherein applying the at least one transformation on at least a portion of the data comprises transforming unstructured data to generate structured data, wherein the transformed input data comprises the generated structured data.

5. The method of claim 1, wherein applying the at least one transformation on at least a portion of the data comprises transforming first structured data to generate second structured data, wherein the transformed input data comprises the generated second structured data.

6. The method of claim 1, further comprising storing the transformed input data.

7. The method of claim 6, wherein the transformed input data is stored independent of the plurality of versions of application data.

8. The method of claim 1, wherein the predefined format is associated with the model.

9. The method of claim 1, wherein exposing access to the plurality of versions of the application data comprises exposing access to each version of the application data via a corresponding application program interface (API) of a plurality of APIs.

10. The method of claim 1, wherein each entry of the metadata comprises, for a given model execution, a model identifier.

11. The method of claim 10, wherein each entry of the metadata identifies, for the given model execution, input to the model execution and output of the model execution.

12. An apparatus for a process flow for model-based applications, the apparatus comprising one or more processors and memory storing instructions that, when executed, cause the one or more processors to perform steps comprising:
receiving data from one or more data sources;
applying at least one first transformation on at least a portion of the data to generate transformed input data encoded according to a predefined format;
providing the transformed input data to an executed instance of a model facilitating a prediction associated with the data;
applying at least one second transformation to the output associated with the model to generate a plurality of versions of application data, wherein each version of the application data is encoded in a different format corresponding to a different application;
exposing access to the plurality of versions of the application data based on an output associated with the model; and
updating an execution metadata store storing metadata facilitating replay of one or more model executions, wherein the metadata is stored separate from data described by the metadata.

13. The apparatus of claim 12, wherein the one or more data sources comprise a data store or a streaming data source.

14. The apparatus of claim 12, wherein the data comprises structured data and unstructured data.

15. The apparatus of claim 12, wherein applying the at least one transformation on at least a portion of the data comprises transforming unstructured data to generate structured data, wherein the transformed input data comprises the generated structured data.

16. The apparatus of claim 12, wherein applying the at least one transformation on at least a portion of the data comprises transforming first structured data to generate second structured data, wherein the transformed input data comprises the generated second structured data.

17. The apparatus of claim 12, wherein the steps further comprise storing the transformed input data.

18. The apparatus of claim 17, wherein the transformed input data is stored independent of the plurality of versions of application data.

19. The apparatus of claim 12, wherein the predefined format is associated with the model.

20. The apparatus of claim 12, wherein exposing access to the plurality of versions of the application data comprises exposing access to each version of the application data via a corresponding application program interface (API) of a plurality of APIs.

* * * * *